C. T. BOTTS.
Straw Cutter.
No. 1,102. Patented March 15, 1839.
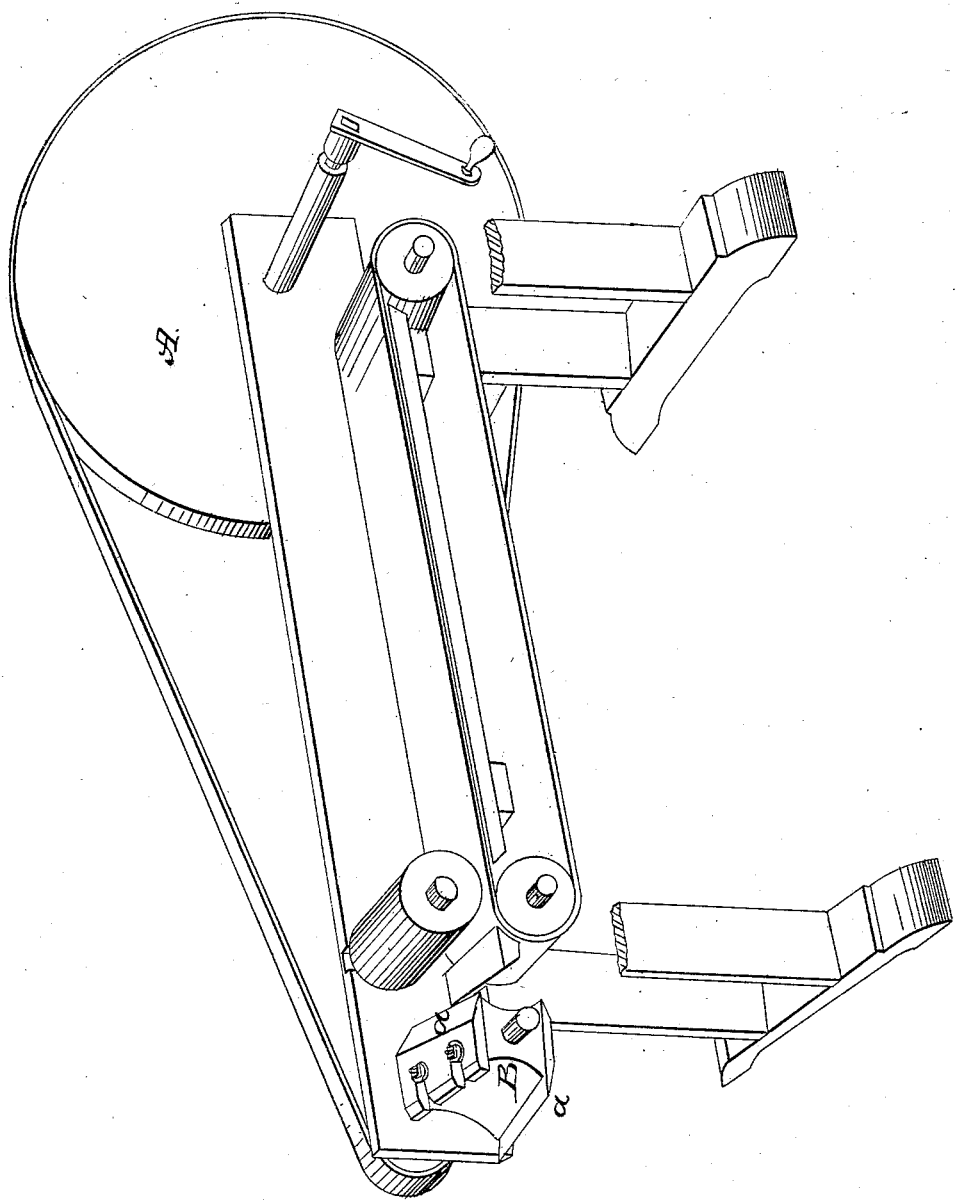

UNITED STATES PATENT OFFICE.

CHAS. T. BOTTS, OF RICHMOND, VIRGINIA.

MACHINE FOR CUTTING STRAW.

Specification of Letters Patent No. 1,102, dated March 15, 1839.

*To all whom it may concern:*

Be it known that I, CHARLES T. BOTTS, of the city of Richmond, in the county of Henrico and State of Virginia, have invented an Improvement in the Manner of Constructing the Machine for Cutting Straw; and I do hereby declare that the following is a full and exact description thereof.

I construct a trough such as is usually made for receiving the straw to be cut, and along the bottom of this an endless apron is stretched by means of two rollers, one of which is turned by means of a cogwheel on the axle of the main driving wheel, which gears into a cog wheel on the axis of the hind roller, and by this means the feeding of the straw to the knives is effected. On the front end of the machine a hub revolves, which carries the knives, or cutters; this hub is made conical, and its axis crosses the fore end of the cutting box, at right angles to its sides. Upon the periphery of this conical hub, I affix two, or any other suitable number of knives, by means of screws, the edges of which knives pass, in the revolution of the hub, near to the fore end of the bottom of the cutting box, which is armed with iron, in the usual manner, to sustain the straw against the knife. Portions of the conical hub, between the knives, are cut away, to admit of the free escape of the cut straw. The part forming the seat of the knife is also cut away so as to slope back sufficiently, to cause the edge to stand out, and cut the straw so as to admit the knife and its fixtures to revolve without touching.

In the accompanying drawing one side of the cutting box is in part removed for the purpose of exhibiting the conical hub, and the cutters thereon.

A, is the main driving, or fly wheel, a band from which passes around a whirl on the shaft of the hub, carrying the cutters.

B, is the conical hub, having upon it the cutters *a*, *a*, affixed thereto by screws, or otherwise.

The benefit resulting from the particular construction of this machine is dependent upon the conical form of the hub, by which the angle which the edge of the knife forms with the straw which it cuts as it revolves, is perpetually varied, and the perfect effect of a drawing motion is thereby obtained, and the cutting facilitated in an eminent degree.

All that I claim as my invention, and desire to secure by Letters Patent is—

The giving to the hub upon which the knives are affixed the form of the frustum of a cone, in the manner, and for the purpose set forth. And it is hereby to be understood, that by this conical form, nothing more is intended than that the portion of the revolving hub, or body, to which the knives are attached, shall be so formed as for their edges to stand in that direction which shall cause them in their revolution to generate the frustum of a cone.

CH. T. BOTTS.

Witnesses:
   THOS. P. JONES,
   CADWALLADER EVANS.